(12) United States Patent
Suzuki (10) Patent No.: US 12,043,065 B2
(45) Date of Patent: Jul. 23, 2024

(54) PNEUMATIC TIRE

(71) Applicant: The Yokohama Rubber Co., LTD., Tokyo (JP)

(72) Inventor: Yuhei Suzuki, Hiratsuka (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 731 days.

(21) Appl. No.: 16/491,150

(22) PCT Filed: Mar. 5, 2018

(86) PCT No.: PCT/JP2018/008392
§ 371 (c)(1),
(2) Date: Sep. 4, 2019

(87) PCT Pub. No.: WO2018/164072
PCT Pub. Date: Sep. 13, 2018

(65) Prior Publication Data
US 2020/0031172 A1    Jan. 30, 2020

(30) Foreign Application Priority Data

Mar. 6, 2017    (JP) .................... 2017-041923

(51) Int. Cl.
*B60C 11/13*    (2006.01)
*B60C 11/03*    (2006.01)
*B60C 11/11*    (2006.01)

(52) U.S. Cl.
CPC .......... *B60C 11/13* (2013.01); *B60C 11/0309* (2013.01); *B60C 11/11* (2013.01); *B60C 2200/14* (2013.01)

(58) Field of Classification Search
CPC ... B60C 11/0309; B60C 11/033; B60C 11/11; B60C 11/1236; B60C 11/13;
(Continued)

(56) References Cited

U.S. PATENT DOCUMENTS

D379,334 S  *  5/1997  Rohweder ................... D12/596
D416,838 S  * 11/1999  Cercek ......................... D12/579
(Continued)

FOREIGN PATENT DOCUMENTS

JP    2014-121916    7/2014
JP    2015-223884    12/2015
(Continued)

OTHER PUBLICATIONS

International Search Report for International Application No. PCT/JP2018/008392 dated Jun. 5, 2018, 3 pages, Japan.

*Primary Examiner* — Justin R Fischer
*Assistant Examiner* — Philip N Schwartz
(74) *Attorney, Agent, or Firm* — Thorpe North & Western (57) ABSTRACT

Provided is a pneumatic tire. Center blocks in a center region of a tread section are arrayed to form a pair between which are interposed inclined grooves inclined with respect to a circumferential direction. The center blocks straddle an equator from one side to the other. Notches composed of a first and second walls connected in a V shape are in treads in each center block. The first walls extend at an angle within ±20° with respect to the circumferential direction. The second walls extend at an angle of ±10° with respect to a width direction. Inclined grooves are each constituted by a see-through portion and an expanded portion having a larger groove width than the see-through portion. A width of a see-through region that can extend without intersecting an extension line of the see-through portion is made to be equal to or greater than 30% of a tread width.

7 Claims, 4 Drawing Sheets

(58) Field of Classification Search
CPC ....... B60C 2011/133; B60C 2011/0383; B60C 2200/14; B60C 2200/06
See application file for complete search history.

(56) References Cited

U.S. PATENT DOCUMENTS

| | | | |
|---|---|---|---|
| D444,426 S * | 7/2001 | Marazzi | D12/596 |
| D567,749 S * | 4/2008 | Brown | D12/579 |
| D811,320 S * | 2/2018 | Kuwahara | D12/602 |
| 2003/0041939 A1 | 3/2003 | Allison et al. | |
| 2005/0103416 A1 | 5/2005 | Rooney et al. | |
| 2009/0107599 A1* | 4/2009 | Lamb | B60C 11/0311 |
| | | | 152/209.8 |
| 2017/0120687 A1 | 5/2017 | Rubber | |
| 2018/0207989 A1* | 7/2018 | Sueyoshi | B60C 11/01 |

FOREIGN PATENT DOCUMENTS

| | | |
|---|---|---|
| JP | 2016-222207 | 12/2016 |
| JP | 2017-081439 | 5/2017 |
| WO | WO 03/020538 | 3/2003 |

* cited by examiner

FIG. 4

PNEUMATIC TIRE

TECHNICAL FIELD

The present technology relates to a pneumatic tire suitable as a tire for driving on unpaved roads, and in particular, the present technology relates to a pneumatic tire that improves running performance on unpaved roads.

BACKGROUND ART

Pneumatic tires that are used for driving on unpaved roads, such as uneven ground, muddy land, snowy road, sandy ground, and rocky land, generally have a tread pattern mainly including lug grooves and blocks with large edge components, and generally have a large groove area. Such tires bite into mud, snow, sand, stone, rock, and the like on a road surface (hereinafter, referred to collectively as "mud or the like") so as to obtain traction performance, and prevent mud or the like from becoming clogged in the grooves so as to improve running performance on unpaved roads (for example, see Japan Unexamined Patent Publication No. 2015-223884). However, even such tires cannot be said as necessarily obtaining sufficient traveling performance on unpaved roads (in particular, traction performance and starting performance), and are required of further improvements.

SUMMARY

The present technology provides a pneumatic tire that is suitable for use as a tire for traveling on unpaved roads and that improves traveling performance on unpaved roads.

A pneumatic tire according to an embodiment of the present technology includes: a tread portion extending in a tire circumferential direction to form an annular shape; a pair of sidewall portions disposed on both sides of the tread portion; and a pair of bead portions disposed inward of the sidewall portions in a tire radial direction, in which a plurality of center blocks are provided on a center region of the tread portion, in which the center blocks are arrayed so as to pair one another with inclined grooves extending in a manner inclined with respect to the tire circumferential direction, in which among each pair of the center blocks, a center block on one side extends beyond a tire equator from the one side to another side of the tire equator, and a center block on said another side extends beyond the tire equator from said another side to the one side of the tire equator, in which each of the center blocks has a notch formed by two wall surfaces connected in a V-shape on a tread contact surface, in which the two wall surfaces include a first wall that extends at an angle within ±20° with respect to the tire circumferential direction on the tread contact surface and a second wall that extends at an angle within ±10° with respect to a tire lateral direction, in which each of the inclined grooves includes a see-through portion that can be seen through from one end to another end and an expanded portion having a groove width expanded with respect to the see-through portion, and in which a see-through region of the see-through portion in which an extension line is not blocked by another block occupies 30% or more of a tread contact surface width.

In the present technology, since the center blocks extend beyond the tire equator as described above, edge components of the center blocks in the tire lateral direction can be increased, and running performance on unpaved roads (for example, mud performance or the like) can be improved. In addition, by providing notches on each of the center blocks, mud or the like inside the grooves can be effectively gripped due to the notches, and thereby the running performance on unpaved roads (for example, mud performance or the like) can be improved. In particular, since extension directions of the first wall and the second wall are set to the above-described angles, the first wall prevents lateral slippage of the tire, and the second wall is advantageous in improving the traction performance. Furthermore, since each of the inclined grooves includes the see-through portion and sufficient see-through region is ensured with respect to the tread contact surface width, flow of mud or the like within the inclined grooves is favorable, and discharge performance of mud or the like can be improved. At this time, since the inclined groove includes the expanded portion in addition to the see-through portion, the edge component can be increased, and as a result of such synergy, the running performance on unpaved roads (for example, mud performance or the like) can be improved effectively.

In the present technology, preferably, expanded portions are present on both of the wall surfaces of each of the inclined grooves, the expanded portion of one of the wall surfaces and the expanded portion of another one of the wall surfaces overlap each other with the see-through portion interposed therebetween, so as to form a widened portion having a widened groove width with respect to the part of the inclined groove, and the groove width in the widened portion is from 1.5 times to 2.0 times of a width of the see-through portion. Since the widened portion with an appropriate size with respect to the see-through portion are provided in this manner, mud or the like in the widened portion is compressed due to deformation of the center blocks during traveling, and shear force is obtained, which is advantageous in improving the traveling performance on unpaved roads.

In the present technology, an area of each of the inclined grooves is preferably 150% to 250% of an area of the see-through portion between road contact surfaces of a pair of the center blocks adjacent to the inclined groove. Since the area of the inclined grooves with respect to the see-through portion (the area of the expanded portion) is set to an appropriate range, the balance between the see-through portion and the inclined groove (the expanded portion) is favorable, which is advantageous in achieving both the shear force due to the inclined grooves and the discharge performance of mud or the like in a well-balanced manner.

In the present technology, an inclination angle of the see-through portion on the tread contact surface is preferably within 30°±10° with respect to the tire equator. As a result, the balance between the edge component in the tire circumferential direction and the edge components in the tire lateral direction of the inclined grooves is improved, which is advantageous in improving the running performance on unpaved roads.

In the present technology, preferably, each of the wall surfaces of each of the center blocks adjacent to each of the inclined grooves includes: a portion directly adjacent to the see-through portion, a portion adjacent to the expanded portion, and a coupling portion that connects the portion directly adjacent to the see-through portion and the portion adjacent to the expanded portion, and the coupling portion extends at an angle within 40°±10° with respect to the see-through portion on the tread contact surface. Since the wall surfaces of the center blocks are configured in this manner, the shapes of the wall surfaces are favorable, and the shear force due to the inclined grooves and the discharge performance of mud or the like are balanced in a well-balanced manner, which is advantageous in improving the running performance on unpaved roads.

In the present technology, preferably, connecting grooves that respectively connect ones of the inclined grooves adjacent in the tire circumferential direction are formed between the pairs of the center blocks adjacent in the tire circumferential direction, and the connecting grooves extend at an angle within ±10° with respect to a tire axial direction. Since the connecting grooves are provided in this manner, the edge component of the connecting grooves in the tire lateral direction can be increased, which is advantageous in improving the running performance on unpaved roads.

In the present technology, various dimensions (lengths and angles) are values as measured when the tire is mounted on a regular rim and inflated to a regular internal pressure, and placed vertically upon a flat surface with a regular load applied thereto. "Length" is a length on the tread contact surface unless otherwise defined. The "contact surface" of each block is a surface portion of each block actually contacting a plane on which the tire is placed in this state, and does not include, for example, a chamfered portion that is actually not in contact. Additionally, "ground contact edge" refers to both end portions in the tire axial direction in this state. "Regular rim" is a rim defined by a standard for each tire according to a system of standards that includes standards on which tires are based, and refers to a "standard rim" in the case of JATMA (The Japan Automobile Tyre Manufacturers Association, Inc.), refers to a "design rim" in the case of TRA (The Tire and Rim Association, Inc.), and refers to a "measuring rim" in the case of ETRTO (The European Tyre and Rim Technical Organisation). "Regular internal pressure" is an air pressure defined by standards for each tire according to a system of standards that includes standards on which tires are based, and refers to a "maximum air pressure" in the case of JATMA, refers to the maximum value in the table of "TIRE ROAD LIMITS AT VARIOUS COLD INFLATION PRESSURES" in the case of TRA, and refers to the "INFLATION PRESSURE" in the case of ETRTO. "Regular internal pressure" is 180 kPa for a tire on a passenger vehicle. "Regular load" is a load defined by a standard for each tire according to a system of standards that includes standards on which tires are based, and refers to a "maximum load capacity" in the case of JATMA, refers to the maximum value in the table of "TIRE ROAD LIMITS AT VARIOUS COLD INFLATION PRESSURES" in the case of TRA, and refers to "LOAD CAPACITY" in the case of ETRTO. "Regular load" corresponds to 88% of the loads described above for a tire on a passenger vehicle.

DETAILED DESCRIPTION

Configurations of embodiments of the present technology will be described in detail below with reference to the accompanying drawings.

Figure 1:
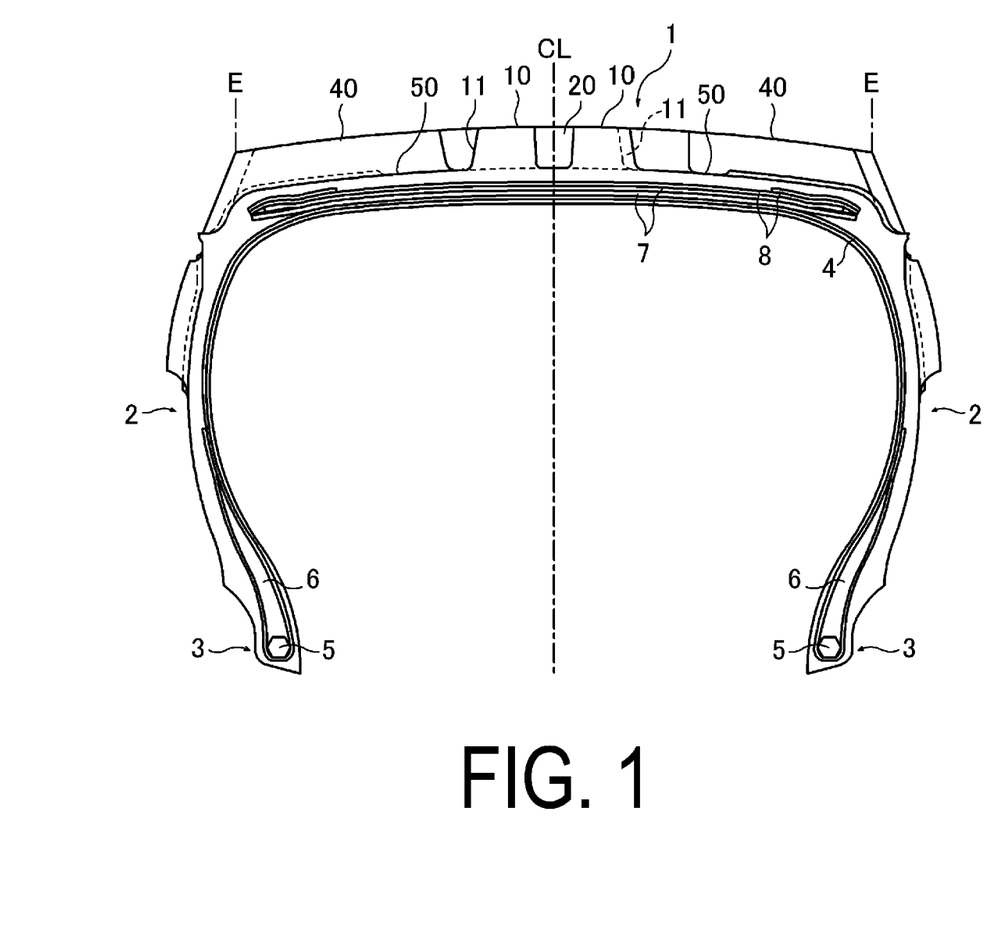
FIG. 1 is a meridian cross-sectional view of a pneumatic tire according to an embodiment of the present technology.

As illustrated in FIG. 1, the pneumatic tire of an embodiment of the present technology includes an annular tread portion 1 extending in the tire circumferential direction, a pair of sidewall portions 2 disposed on both sides of the tread portion 1, and a pair of bead portions 3 disposed inward of the sidewall portions 2 in the tire radial direction. Note that the reference sign "CL" in FIG. 1 denotes the tire equator, and the reference signs E denote the ground contact edges.

A carcass layer 4 is mounted between the left-right pair of bead portions 3. The carcass layer 4 includes a plurality of reinforcing cords extending in the tire radial direction, and is folded back around a bead core 5 disposed in each of the bead portions 3 from a vehicle inner side to a vehicle outer side. Additionally, bead fillers 6 are disposed on the periphery of the bead cores 5, and each bead filler 6 is enveloped by a main body portion and a folded back portion of the carcass layer 4. In the tread portion 1, a plurality of belt layers 7 (two layers in FIG. 1) are embedded on the outer circumferential side of the carcass layer 4. The belt layers 7 each include a plurality of reinforcing cords that are inclined with respect to the tire circumferential direction, with the reinforcing cords of the different layers arranged in a criss-cross manner. In these belt layers 7, the inclination angle of the reinforcing cords with respect to the tire circumferential direction ranges from, for example, 10° to 40°. In addition, a belt reinforcing layer 8 is provided on the outer circumferential side of the belt layers 7. The belt reinforcing layer 8 includes organic fiber cords oriented in the tire circumferential direction. In the belt reinforcing layer 8, the angle of the organic fiber cords with respect to the tire circumferential direction is set, for example, to from 0° to 5°.

The present technology may be applied to such a general pneumatic tire, however, the cross-sectional structure thereof is not limited to the basic structure described above.

Figure 2:
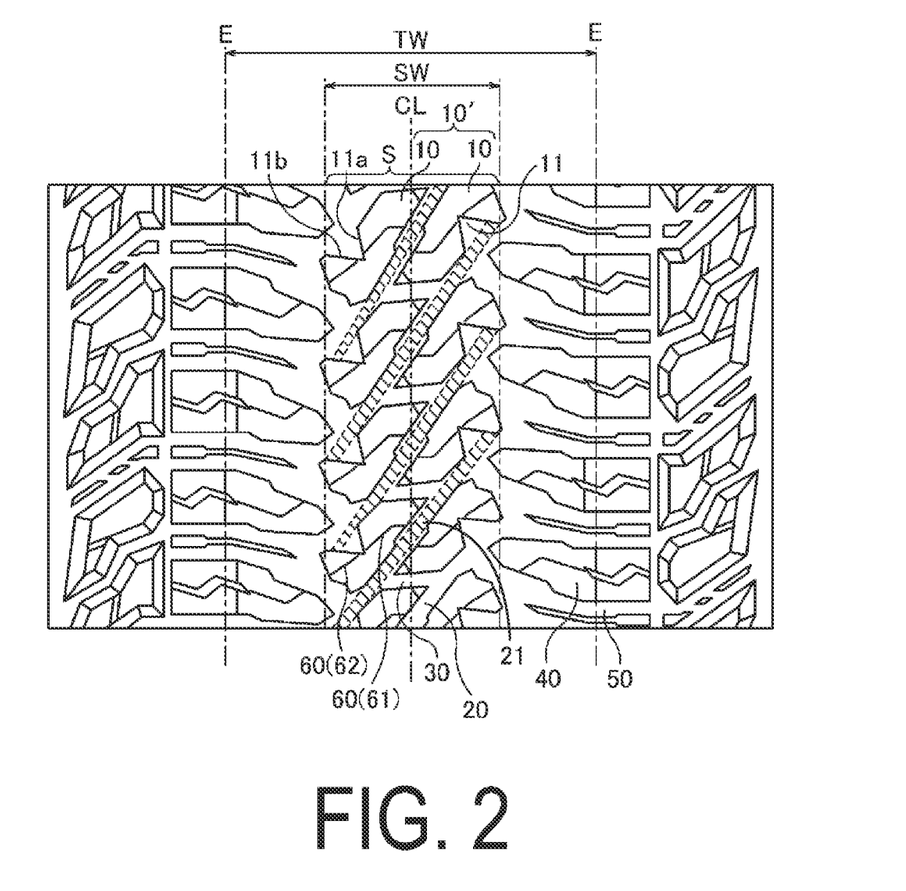
FIG. 2 is a front view illustrating a tread surface of the pneumatic tire according to an embodiment of the present technology.

As illustrated in FIGS. 1 and 2, a plurality of center blocks 10 are provided in a center region of an outer surface of the tread portion 1. The center blocks 10 are arrayed so as to pair one another (block pairs 10') with inclined grooves 20 extending in a manner inclined with respect to the tire circumferential direction. Among the block pair 10', a center block 10 on one side (the left side of the tire equator in the drawing) extends beyond the tire equator CL from the one side (the left side of the tire equator CL in the drawing) to the other side (the right side of the tire equator CL in the drawing) of the tire equator CL, and a center block 10 on the other side (the right side of the tire equator CL in the drawing) extends beyond the tire equator CL from the other side (the right side of the tire equator CL in the drawing) to the one side (the left side of the tire equator CL in the drawing) of the tire equator CL.

Figure 3:
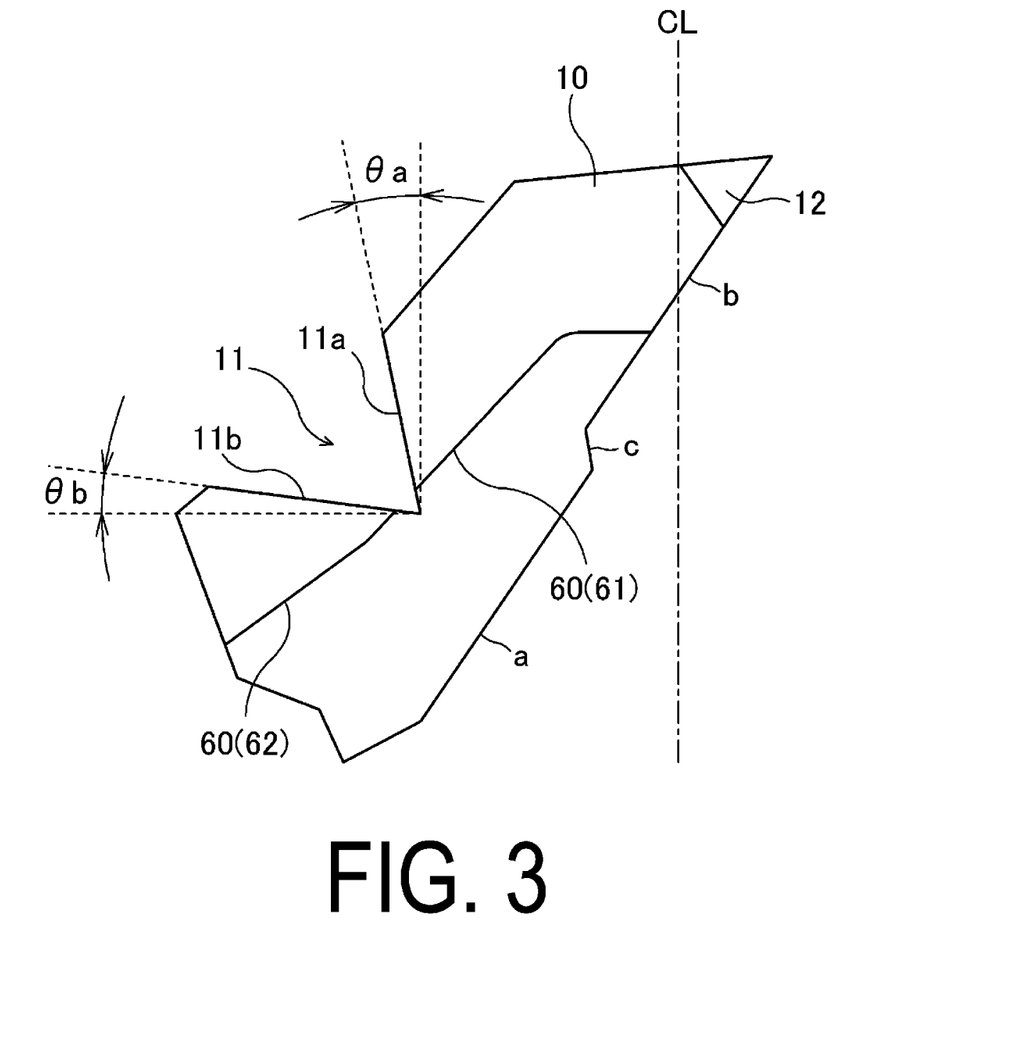
FIG. 3 is an enlarged front view illustrating a center block of FIG. 2.

As illustrated in the enlarged view in FIG. 3, the wall surfaces on the outer side in the tire lateral direction (the wall surfaces on the opposite side of the inclined grooves 20) of each of the center blocks 10 has a notch 11 formed by two wall surfaces (a first wall 11a and a second wall 11b) connected in a V-shape on the tread contact surface. The first wall 11a extends at an angle within ±20° with respect to the tire circumferential direction on the tread contact surface, and the second wall 11b extends at an angle within ±10° with respect to the tire lateral direction. In other words, on the tread contact surface, an angle θa formed by the first wall 11a with respect to the tire circumferential direction is within ±20°, and an angle θb formed by the second wall 11b with respect to the tire circumferential direction is within ±10°.

Figure 4:
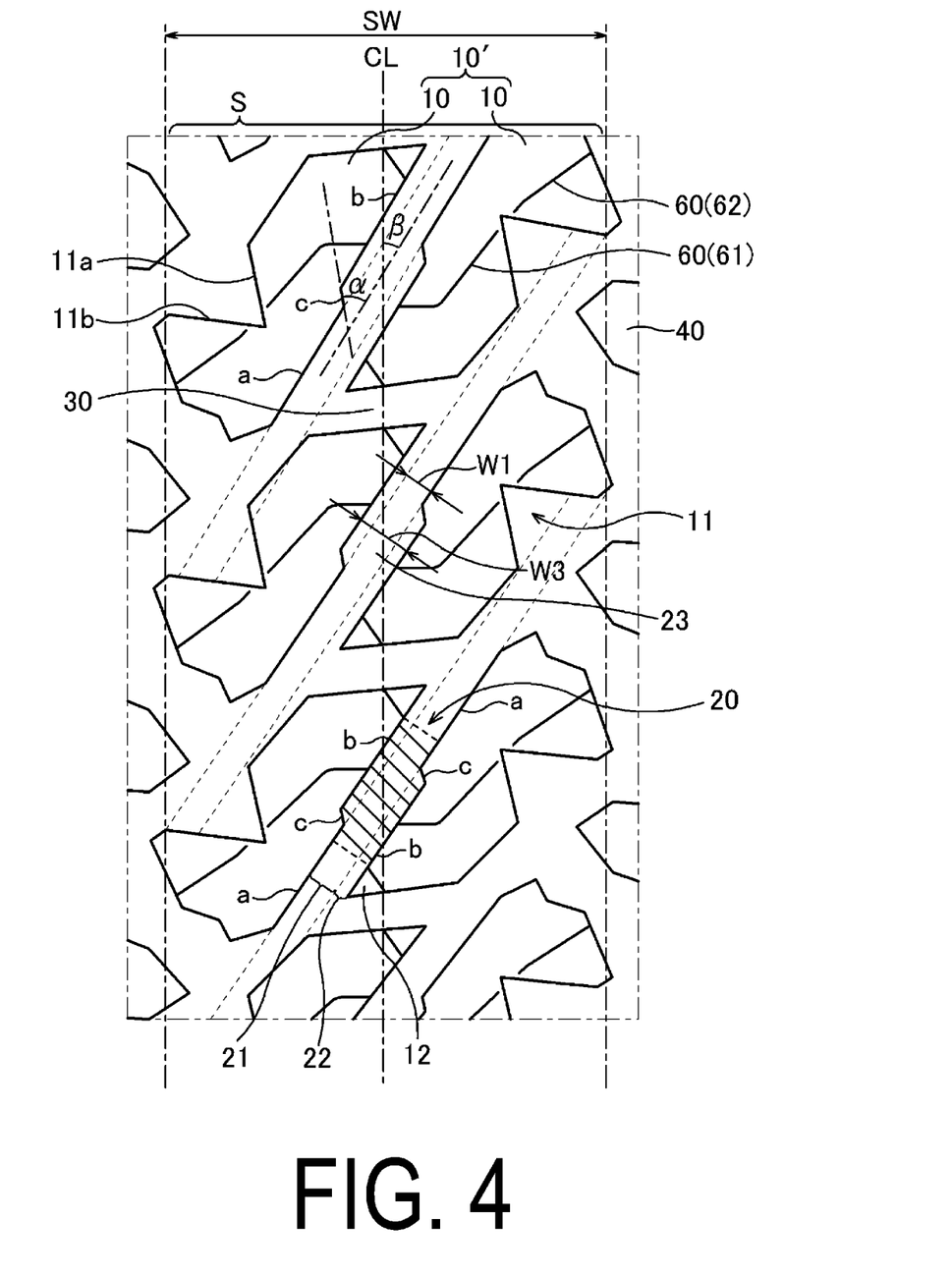
FIG. 4 is an enlarged front view illustrating inclined grooves and the periphery thereof of FIG. 2.

As illustrated in detail in FIG. 4, each of the inclined grooves 20 includes a see-through portion 21 that can be seen through from one end to another end and an expanded portion 22 having a groove width expanded with respect to the see-through portion 21 In particular, in the illustrated example, the inclined groove 20 is bent, and a portion of groove walls of the inclined groove 20 (wall surfaces on the inclined groove side of the center blocks 10 adjacent to the inclined groove 20) protrudes toward the inner side of the inclined groove 20 to form a step, so as to form the see-through portion 21 and the expanded portion 22. More specifically, each of the groove walls of the inclined groove 20 (the wall surface on the inclined groove 20 side of the center blocks 10 adjacent to the inclined groove 20) includes a relatively protruding portion a and a relatively recessed portion b with respect to the inner side of the inclined groove 20. The see-through portion 21 is formed between the extension lines of the relatively protruding portions a of both the groove walls that form the inclined groove 20 (the wall surfaces of the center block pair 10' adjacent to the inclined groove 20). The expanded portions 22 are formed between the extension lines of the relatively protruding portions a and the relatively recessed portions b respectively.

At this time, when a region in the tire lateral direction in which the extension line of the see-through portion 21 shown with diagonal lines in FIG. 2 (strictly, a strip-like region that extends the see-through portion) can extend without being blocked by the other blocks is defined as a see-through region S, a width SW of the see-through region S occupies a range of 30% or more, and preferably 35% or more and 45% or less of a tread contact surface width TW. Note that "tread contact surface width TW" refers to the distance between the end portions of the tread contact surface in the tire lateral direction, and substantially coincides with the distance between the ground contact edges E (the ground contact width) in the illustrated example.

Since the center blocks 10 are provided so as to form the block pairs 10' and each of the center blocks 10 extends beyond the tire equator CL in this manner, the edge component in the tire lateral direction of the center blocks 10 can be increased, and the running performance on unpaved roads (for example, the mud performance or the like) can be improved. In addition, since the center blocks 10 includes the notches 11, mud or the like in the grooves can be effectively gripped due to the notches 11, and the running performance on unpaved roads (for example, mud performance or the like) can be improved. In particular, since the extension directions of the first wall 11a and the second wall 11b are set to the angles described above, the first wall prevents lateral slippage of the tire, and the second wall can improve the traction performance, which is advantageous in improving the traveling performance on unpaved roads. Furthermore, since each of the inclined grooves 20 includes the see-through portion 21 and a sufficient see-through region S is ensured with respect to the tread contact surface width TW, flow of mud or the like within the inclined grooves 20 is favorable, and the discharge performance of mud or the like can be improved. At this time, since the inclined groove 20 includes the expanded portion 22 in addition to the see-through portion 21, the edge component can be increased, and as a result of such synergy, the running performance on unpaved roads (for example, mud performance or the like) can be improved effectively.

If the center block 10 has a shape that does not extend beyond the tire equator CL, the edge component of the center blocks 10 in the tire lateral direction cannot be ensured sufficiently, and the running performance on unpaved roads cannot be improved. If the angle $\theta a$ of the first wall 11a deviates from the range within ±20° with respect to the tire circumferential direction, since the extension direction of the first wall 11a on the tread contact surface is excessively inclined with respect to the tire circumferential direction, the edge effect due to the first wall 11a cannot be obtained sufficiently, and slippage of the tire cannot be prevented sufficiently. If the angle $\theta b$ of the second wall 11b deviates from the range within ±10° with respect to the tire lateral direction, since the extension direction of the second wall 11b on the tread contact surface is excessively inclined with respect to the tire lateral direction, the edge effect due to the first wall 11b cannot be obtained sufficiently, and the traction performance cannot be improved sufficiently. If the wall angles of the first wall 11a and the second wall 11b are smaller than the wall angle of the wall surface provided with the notches 11, it becomes difficult to sufficiently ensure block rigidity.

If the inclined groove 20 does not have the see-through portion 21, discharge performance of mud or the like will be deteriorated, and the traveling performance on unpaved roads (for example, mud performance or the like) will be affected negatively. Conversely, when the inclined groove 20 includes only by the see-through portion 21 without including the expanded portion 22, the edge component is insufficient in the vicinity of the tire equator CL (in the vicinity of the inclined groove 20), and the running performance on unpaved roads (for example, the mud performance or the like) cannot be improved sufficiently. If the width SW of the see-through region S is less than 30% of the road contact surface width TW, the discharge performance of mud or the like will be deteriorated, and the traveling performance on unpaved roads (for example, mud performance or the like) will be affected negatively.

As illustrated, the expanded portions 22 may be respectively provided on both groove walls that form the inclined groove 20 (the wall surfaces on the inclined groove 20 side of each of the pair of center blocks adjacent to the inclined groove 20), and the expanded portion 22 of one of the wall surfaces and the expanded portion 22 of the other one of the wall surfaces preferably overlap each other with the see-through portion 21 interposed therebetween, so as to form a widened portion 23 having a widened groove width with respect to the other part of the inclined groove 20. In the illustrated example, on one of the wall surfaces that form the inclined groove 20 (the wall surface on the left side in the drawing), the expanded portion 22 is absent on one end portion side of the inclined groove 20 (the left end portion in the drawing), and the expanded portion 22 is present on the other end portion side of the inclined groove 20 (the right end portion in the drawing). In contrast, on the other one of the wall surfaces constituting the inclined groove 20 (the wall surface on the right side in the drawing), the expanded portion 22 is present on the one end portion side of the inclined groove 20 (the left end portion in the drawing), and the expanded portion 22 is absent on the other end portion side of the inclined groove 20 (the right end portion in the drawing). In addition, in the intermediate portion of the inclined groove 20, the expanded portion 22 of the wall surface on the one side (the wall surface on the left side in the drawing) among the wall surfaces constituting the inclined groove 20 and the expanded portion 22 of the wall surface on the other side (the wall surface on the right side in the drawing) of the wall surfaces constituting the inclined groove 20 overlap each other with the see-through portion 21 interposed therebetween, so as to form the widened portion 23. The widened portion 23 is a portion where the see-through portion 21 and the expanded portions 22 on both sides thereof overlap one another, and thus has a groove width greater than the groove width of the other portion of the inclined groove 20 (in the illustrated example, the portion where only the see-through portion 21 and one of the expanded portions 22 overlap each other). By providing the widened portion 23 in this manner, mud or the like in the widened portion 23 are compressed due to deformation of the center blocks 10 during traveling, and shear force is obtained, which is advantageous in improving traveling performance on unpaved roads.

At this time, a groove width W3 in the widened portion 23 is preferably from 1.5 times to 2.0 times of a width W1 of the see-through portion 21. By setting the widened portion 23 to an appropriate size with respect to the see-through portion 21 in this manner, it is possible to favorably exhibit the effects described above (shear force due to mud or the like in the widened portion 23 being compressed) while maintaining the discharge performance of mud or the like within the inclined groove 20. If the groove width W3 of the widened portion 23 is less than 1.5 times of the width W1 of the see-through portion 21, the widened portion 23 is small, and cannot sufficiently obtain a shear force due to mud or the like in the widened portion 23. If the groove width W3 of the widened portion 23 exceeds 2.0 times of the width W1 of the see-through portion 21, excessive bending of the groove walls of the inclined grooves 20 will negatively affect the discharge performance of mud or the like.

An area A of the inclined groove 20 (the total area of the see-through portion 21 and the expanded portions 22) in a region (the hatched portion in FIG. 4) between the road contact surfaces of the pair of center blocks 10 (the surfaces of the center blocks 10 actually in contact with the ground except for chamfered portions 12) adjacent to the inclined groove 20 is preferably 150% to 250% of an area A1 of the see-through portion 21 in this region. By setting the area A of the inclined groove 20 (the area of the expanded portions 22) with respect to the area A1 of the see-through portion 21 to a suitable range, the balance between the see-through portion 21 and the inclined groove 20 (the expanded portions 22) is favorable, which is advantageous in achieving both the shear force due to the inclined grooves 20 and the discharge performance of mud or the like in a well-balanced manner. At this time, if the area A of the inclined groove 20 is less than 150% of the area A1 of the see-through portion 21, since the area of the inclined groove 20 (the expanded portions 22) is small with respect to the see-through portion 21, the size of the widened portion 23 cannot be ensured sufficiently, and it becomes difficult to effectively exhibit the shear force described above. If the area A of the inclined groove 20 exceeds 250% of the area A1 of the see-through portion 21, the area of the inclined groove 20 (the expanded portion 22) is excessively large with respect to the see-through portion 21, and excessive bending of the groove walls of the inclined grooves 20 will negatively affect the discharge performance of mud or the like As described above, in the present technology, the see-through portion 21 and the expanded portions 22 are configured by forming steps on the groove walls constituting the inclined groove 20 (the wall surfaces on the inclined groove 20 side of each of the center blocks 10 adjacent to the inclined groove 20). At this time, as illustrated, each of the wall surfaces of the center blocks 10 adjacent to the inclined groove 20 preferably includes: a portion a directly adjacent to the see-through portion 21, a portion b adjacent to the expanded portion 22, and a coupling portion c that connects the portion a and the portion b. Additionally, the coupling portion c preferably extends at an angle within 40°±10° with respect to the see-through portion 21 on the tread contact surface. In other words, an angle α of the coupling portion c with respect to the see-through portion 21 is preferably within 40°±10°. By configuring the wall surfaces of the center blocks 10 in this manner, the shapes of the groove walls that constitute the inclined groove 20 are favorable, which is advantageous in achieving both the shear force due to the inclined grooves 20 and the discharge performance of mud or the like in a well-balanced manner, and improving traveling performance on unpaved roads. If the angle α of the coupling portion c with respect to the see-through portion 21 is less than 30° (=40°−10°), an edge is not formed sufficiently, and it is difficult to sufficiently obtain a shear force due to the widened portion 23. If the angle α of the coupling portion c with respect to the see-through portion 21 exceeds 50° (=40°+10°), the groove walls of the inclined groove 20 will be bent greatly, which negatively affects the discharge performance of mud or the like.

As described above, the inclined groove 20 is a groove that extends in a manner inclined with respect to the tire circumferential direction between the pair of center blocks 10, and the inclination angle thereof, in particular an inclination angle β of the see-through portion 21 on the tread contact surface, is preferably within 30°±10° with respect to the tire equator CL. As a result, the balance between the edge component in the tire circumferential direction and the edge component in the tire lateral direction due to the inclined grooves 20 is improved, which is advantageous in improving the running performance on unpaved roads. At this time, if the inclination angle β deviates from the range described above, the balance between the edge component in the tire circumferential direction and the edge component in the tire lateral direction collapses, and as a result, the balance between the traction characteristics and lateral slippage resistance is deteriorated, and it is difficult to favorably exhibit the running performance on unpaved roads.

Since the center block pairs 10' are arranged at intervals in the tire circumferential direction, grooves are formed between center blocks 10' that are adjacent in the tire circumferential direction. As illustrated in the drawings, connecting grooves 30 that respectively connect the inclined grooves 20 adjacent in the tire circumferential direction are preferably formed as such grooves. In particular, the connecting grooves 30 preferably extend at an angle within ±10° with respect to the tire axial direction. Additionally, the connecting grooves 30 are preferably provided at positions intersecting the tire equator CL. By providing the connecting grooves 30 in this manner, it is possible to increase the edge component in the tire lateral direction so as to improve the traction performance, which is advantageous in improving the traveling performance on unpaved roads. At this time, if the angle of the connecting grooves 30 with respect to the tire axial direction deviates from the range described above, the edge component of the connecting grooves 30 in the tire lateral direction cannot be sufficiently increased, and it is difficult to improve the traction performance.

As described above, the present technology defines the structure of the center region (the center blocks 10, the inclined grooves 20, and optionally the connecting grooves 30) as described above so as to improve the driving performance on unpaved roads, and thus the structure of the shoulder regions (the region on the outer side in the tire lateral direction of the center block pairs 10') is not particularly limited. For example, as in the illustrated example, the shoulder regions may be provided with a plurality of shoulder blocks 40 arrayed at intervals in the tire circumferential direction and shoulder inclined grooves 50 formed between shoulder blocks 40 adjacent in the tire circumferential direction and extending in the tire lateral direction.

In the present technology, as illustrated, sipes 60 may be provided on blocks formed on the tread portion 1 (the center blocks 10, and optionally the shoulder blocks 40). The shape of the sipes is not particularly limited, and for example, one end of each sipe may be connected to a groove (the inclined grooves 20, the connecting grooves 30, the shoulder inclined grooves 50, and the like), and the sipe depth may be shallower at the end portion that is connected to the groove (the inclined grooves 20, the connecting grooves 30, the shoulder inclined grooves 50, and the like). For example, each of the center blocks 10 of the illustrated example is provided with a sipe 61 whose one end communicates with the connecting groove and whose other end terminates in the vicinity of the inclined groove 20 (the notch 11) and a sipe 62 whose one end communicates with the shoulder inclined groove 40 and whose other end terminates in the vicinity of the inclined groove 20 (the notch 11). In these sipes 61, 62, the sipe depth of the end portion that communicates with the groove (the connecting groove or the shoulder inclined groove) is shallower. By providing such sipes 60 (the sipes 61, 62), it is possible to obtain an edge effect due to the sipes 60 and to improve the traction performance. In a case where the depth of the sipes 60 is changed in this manner, the sipe depth of the relatively shallow portion of each sipe 60 may be set to 0.1 times to 0.4 times of the sipe depth of the relatively deep portion of the sipes 60.

Example

Twenty types of pneumatic tires including Conventional Example 1, Comparative Examples 1 to 5, and Examples 1 to 14 were produced at a tire size of LT265/70R17, and had the basic structure illustrated in FIG. 1, and had the angle θa of the first wall with respect to the tire circumferential direction, the angle θb of the second wall with respect to the tire lateral direction, the structure of the inclined grooves (presence or absence of the see-through portions, the expanded portions, and the widened portions), the ratio of the width SW of the see-through regions to the tread contact surface width TW (SW/TW×100%), the ratio W3/W1 of the width W1 of the see-through portions and the width W3 of the widened portions, the angle α of the coupling portions of the wall surfaces of the center blocks with respect to the see-through portions, the inclination angle β of the see-through portions with respect to the tire equator, and the angle of the connecting grooves set as shown in Tables 1 and 2, based on the tread pattern illustrated in FIG. 2.

In Example 4, although the expanded portions were present on both wall surfaces that form the inclined grooves, since the expanded portions do not reach the intermediate portions of the inclined grooves, the expanded portions do not overlap with each other with the see-through portion interposed therebetween, and the widened portions were not formed.

These twenty types of pneumatic tires were evaluated for mud performance by the evaluation methods described below. The results are also shown in Tables 1 and 2.

Mud Performance

The test tires were assembled on wheels having a rim size of 17×8.0, inflated to an air pressure of 450 kPa, and mounted on a test vehicle (pick-up truck). Sensory evaluation by a test driver was performed on a muddy road surface with respect to traction performance and starting performance. Evaluation results are expressed as index value with Conventional Example 1 being assigned the index value of 100. Larger index values indicate superior mud performance. Note that if an index value of "105" or more is determined that sufficient mud performance was obtained, and an index value of less than "105" is determined that the improvement effect in mud performance, if any, was insufficient as compared with Conventional Example 1.

TABLE 1

|  |  | Conventional Example 1 | Comparative Example 1 | Comparative Example 2 |
|---|---|---|---|---|
| Angle θa of first wall ° | | 30 | 30 | 15 |
| Angle θb of second wall ° | | 20 | 5 | 20 |
| Structure of inclined groove | See-through portion | Yes | Yes | Yes |
| | Expanded portion | Yes | Yes | Yes |
| | Widened portion | Yes | Yes | Yes |
| SW/TW × 100% | | 15 | 15 | 15 |
| G2/G1 | | 1.8 | 1.8 | 1.8 |
| Angle α ° | | 40 | 40 | 40 |
| Angle β ° | | 30 | 30 | 30 |
| Angle of connecting groove ° | | 6 | 6 | 6 |
| Mud performance | Index value | 100 | 102 | 101 |

|  |  | Comparative Example 3 | Comparative Example 4 | Comparative Example 5 |
|---|---|---|---|---|
| Angle θa of first wall ° | | 15 | 15 | 15 |
| Angle θb of second wall ° | | 5 | 5 | 5 |
| Structure of inclined groove | See-through portion | No | Yes | Yes |
| | Expanded portion | — | No | Yes |
| | Widened portion | — | No | Yes |
| SW/TW × 100% | | — | 15 | 15 |
| G2/G1 | | — | — | 1.8 |
| Angle α ° | | — | — | 40 |
| Angle β ° | | 30 | 30 | 30 |
| Angle of connecting groove ° | | 6 | 6 | 6 |
| Mud performance | Index value | 100 | 100 | 103 |

TABLE 1-continued

|  |  | Example 1 | Example 2 | Example 3 | Example 4 |
|---|---|---|---|---|---|
| Angle θa of first wall ° |  | 15 | 15 | 15 | 15 |
| Angle θb of second wall ° |  | 5 | 5 | 5 | 5 |
| Structure of inclined groove | See-through portion | Yes | Yes | Yes | Yes |
|  | Expanded portion | Yes | Yes | Yes | Yes |
|  | Widened portion | Yes | Yes | Yes | No |
| SW/TW × 100% |  | 30 | 40 | 50 | 40 |
| G2/G1 |  | 1.8 | 1.8 | 1.8 | — |
| Angle α ° |  | 40 | 40 | 40 | 40 |
| Angle β ° |  | 30 | 30 | 30 | 30 |
| Angle of connecting groove ° |  | 6 | 6 | 6 | 6 |
| Mud performance | Index value | 107 | 110 | 108 | 105 |

TABLE 2

|  |  | Example 5 | Example 6 | Example 7 | Example 8 | Example 9 |
|---|---|---|---|---|---|---|
| Angle θa of first wall | ° | 15 | 15 | 15 | 15 | 15 |
| Angle θb of second wall | ° | 5 | 5 | 5 | 5 | 5 |
| Structure of inclined groove | See-through portion | Yes | Yes | Yes | Yes | Yes |
|  | Expanded portion | Yes | Yes | Yes | Yes | Yes |
|  | Widened portion | Yes | Yes | Yes | Yes | Yes |
| SW/TW × 100 | % | 40 | 40 | 40 | 40 | 40 |
| G2/G1 |  | 1.3 | 1.5 | 2.0 | 2.5 | 1.8 |
| Angle α | ° | 40 | 40 | 40 | 40 | 40 |
| Angle β | ° | 30 | 30 | 30 | 30 | 20 |
| Angle of connecting groove | ° | 6 | 6 | 6 | 6 | 6 |
| Mud performance | Index value | 106 | 107 | 107 | 106 | 107 |

|  |  | Example 10 | Example 11 | Example 12 | Example 13 | Example 14 |
|---|---|---|---|---|---|---|
| Angle θa of first wall | ° | 15 | 15 | 15 | 15 | 15 |
| Angle θb of second wall | ° | 5 | 5 | 5 | 5 | 5 |
| Structure of inclined groove | See-through portion | Yes | Yes | Yes | Yes | Yes |
|  | Expanded portion | Yes | Yes | Yes | Yes | Yes |
|  | Widened portion | Yes | Yes | Yes | Yes | Yes |
| SW/TW × 100 | % | 40 | 40 | 40 | 40 | 40 |
| G2/G1 |  | 1.8 | 1.8 | 1.8 | 1.8 | 1.8 |
| Angle α | ° | 40 | 30 | 50 | 40 | 40 |
| Angle β | ° | 40 | 30 | 30 | 30 | 30 |
| Angle of connecting groove | ° | 6 | 6 | 6 | 0 | 10 |
| Mud performance | Index value | 107 | 107 | 107 | 107 | 107 |

As can be seen from Tables 1 and 2, Examples 1 to 14 had improved mud performance compared with Conventional Example 1. Although only the mud performance on the muddy road surface was evaluated, when traveling on other unpaved roads (snowy road, sandy ground, rocky land, and the like), the tires of the present technology exhibited the same function as on mud on the muddy road surface against snow, sand, stones, rocks, and the like on the road surface, and thus exhibited excellent running performance on unpaved roads.

On the other hand, Comparative Examples 1, 2 had excessively large angles of the first wall or the second wall (θa or θb), and thus did not obtain sufficient effect of improving the mud performance. Comparative Example 3 did not have the see-through portions of the inclined grooves, and thus had deteriorated discharge performance of mud or the like, and did not obtain sufficient effect of improving the mud performance. Comparative Example 4 did not have the expanded portions of the inclined grooves, and thus had deteriorated traction performance, and did not obtain sufficient effect of improving the mud performance. Comparative Example 5 had a narrow width of the see-through region with respect to the tread contact surface width, and thus did not obtain sufficient effect of improving the mud performance.

The invention claimed is:

1. A pneumatic tire comprising: a tread portion extending in a tire circumferential direction to form an annular shape; a pair of sidewall portions disposed on both sides of the tread portion; and a pair of bead portions disposed inward of the sidewall portions in a tire radial direction,
wherein a plurality of center blocks are provided on a center region of the tread portion, wherein the center blocks are arrayed so as to pair one another with inclined grooves extending in a manner inclined with respect to the tire circumferential direction, wherein among each pair of the center blocks, a center block on one side extends beyond a tire equator from the one side to another side of the tire equator, and a center block on said another side extends beyond the tire equator from said another side to the one side of the tire equator, wherein each of the center blocks has a notch formed by two wall surfaces connected in a V-shape on a tread contact surface, only a singular bend point being present between the two wall surfaces and being where the two wall surfaces are connected, wherein the two wall surfaces include a first wall that extends at an angle within ±20° with respect to the tire circumferential direction on the tread contact surface and a second wall that extends at an angle within ±10° with respect to a tire lateral direction, wherein each of the inclined grooves includes a see-through portion that can be seen through from one end to another end and an expanded portion having a groove width expanded with respect to the see-through portion, wherein a see-through region of the see-through portion in which an extension line is not blocked by another block occupies 30% or more of a tread contact surface width, and wherein an inclination angle of the see-through portion on the tread contact surface is within 30°±10° with respect to the tire equator; wherein
each of the wall surfaces of each of the center blocks adjacent to each of the inclined grooves includes: a portion directly adjacent to the see-through portion, a portion adjacent to the expanded portion, and a coupling portion that connects the portion directly adjacent to the see-through portion and the portion adjacent to the expanded portion, and wherein the coupling portion extends at an angle within 40°±10° with respect to the see-through portion on the tread contact surface.

2. The pneumatic tire according to claim 1, wherein expanded portions are present on both of the wall surfaces of each of the inclined grooves, wherein the expanded portion of one of the wall surfaces and the expanded portion of another one of the wall surfaces overlap each other with the see-through portion interposed therebetween, so as to form a widened portion having a widened groove width with respect to the other part of the inclined groove, and wherein the groove width in the widened portion is from 1.5 times to 2.0 times of a width of the see-through portion.

3. The pneumatic tire according to claim 1, wherein an area of each of the inclined grooves is 150% to 250% of an area of the see-through portion between road contact surfaces of a pair of the center blocks adjacent to the inclined groove.

4. The pneumatic tire according to claim 1, wherein connecting grooves that respectively connect ones of the inclined grooves adjacent in the tire circumferential direction are formed between the pairs of the center blocks adjacent in the tire circumferential direction, and wherein the connecting grooves extend at an angle within ±10° with respect to a tire axial direction.

5. The pneumatic tire according to claim 2, wherein an area of each of the inclined grooves is 150% to 250% of an area of the see-through portion between road contact surfaces of a pair of the center blocks adjacent to the inclined groove.

6. The pneumatic tire according to claim 5, wherein connecting grooves that respectively connect ones of the inclined grooves adjacent in the tire circumferential direction are formed between the pairs of the center blocks adjacent in the tire circumferential direction, and wherein the connecting grooves extend at an angle within ±10° with respect to a tire axial direction.

7. A pneumatic tire comprising: a tread portion extending in a tire circumferential direction to form an annular shape; a pair of sidewall portions disposed on both sides of the tread portion; and a pair of bead portions disposed inward of the sidewall portions in a tire radial direction,
wherein a plurality of center blocks are provided on a center region of the tread portion, wherein the center blocks are arrayed so as to pair one another with inclined grooves extending in a manner inclined with respect to the tire circumferential direction, wherein among each pair of the center blocks, a center block on one side extends beyond a tire equator from the one side to another side of the tire equator, and a center block on said another side extends beyond the tire equator from said another side to the one side of the tire equator, wherein each of the center blocks has a notch formed by two wall surfaces connected in a V-shape on a tread contact surface, only a singular bend point being present between the two wall surfaces and being where the two wall surfaces are connected, wherein the two wall surfaces include a first wall that extends at an angle within ±20° with respect to the tire circumferential direction on the tread contact surface and a second wall that extends at an angle within ±10° with respect to a tire lateral direction, wherein each of the inclined grooves includes a see-through portion that can be seen through from one end to another end and an expanded portion having a groove width expanded with respect to the see-through portion, wherein a see-through region of the see-through portion in which an extension line is not blocked by another block occupies 30% or more of a tread contact surface width, the extension line of the see-through portion is intersected by the second wall of an adjacent center block on the one side adjacent to the center block on the one side, and the extension line of the see-through portion is intersected by the second wall of an adjacent center block on the another side adjacent to the center block on the another side.

\* \* \* \* \*